(12) United States Patent
Murata et al.

(10) Patent No.: US 10,031,361 B2
(45) Date of Patent: Jul. 24, 2018

(54) LIQUID CRYSTAL PANEL

(71) Applicant: Sakai Display Products Corporation, Sakai-shi, Osaka (JP)

(72) Inventors: Ryo Murata, Sakai (JP); Shinji Koiwa, Sakai (JP); Yoshiaki Matsushima, Sakai (JP); Satoru Utsugi, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/787,369

(22) PCT Filed: May 23, 2014

(86) PCT No.: PCT/JP2014/063726
§ 371 (c)(1),
(2) Date: Oct. 27, 2015

(87) PCT Pub. No.: WO2014/199801
PCT Pub. Date: Dec. 18, 2014

(65) Prior Publication Data
US 2016/0070133 A1    Mar. 10, 2016

(30) Foreign Application Priority Data
Jun. 11, 2013 (JP) ................................ 2013-123041

(51) Int. Cl.
*G02F 1/1333* (2006.01)
*G02F 1/1339* (2006.01)

(52) U.S. Cl.
CPC ...... *G02F 1/133345* (2013.01); *G02F 1/1339* (2013.01); *G02F 2001/133311* (2013.01)

(58) Field of Classification Search
CPC ............. G02F 1/133345; G02F 1/1339; G02F 2001/133311; G02F 1/1337;
(Continued)

(56) References Cited

U.S. PATENT DOCUMENTS

2003/0164912 A1* 9/2003 Eguchi .............. G02F 1/133555
349/113
2004/0185301 A1   9/2004 Tsuchiya et al.
(Continued)

FOREIGN PATENT DOCUMENTS

JP     2008-145461 A    6/2008
JP        4916461 B2    2/2012
(Continued)

*Primary Examiner* — Michael Caley
*Assistant Examiner* — Mariam Qureshi
(74) *Attorney, Agent, or Firm* — Rudy J. Ng; Bret E. Field; Bozicevic, Field & Francis LLP

(57) ABSTRACT

A liquid crystal layer is disposed on a second glass substrate side between a first glass substrate and a second glass substrate, a first insulating film and a second insulating film are formed in this order on a surface of the first glass substrate that is disposed on the liquid crystal layer side, the outer edge portion of the liquid crystal layer is surrounded by a sealing material, and a slit is formed in a part or the whole of the peripheral edge portion of the second insulating film disposed on a further inner side than a position at which the second insulating film overlaps the sealing material. In addition, a slit formed in a peripheral edge portion of the first insulating film that corresponds to the sealing material is filled with a gate insulating film having a higher barrier property for gas and/or liquid than the first insulating film.

15 Claims, 3 Drawing Sheets

(58) Field of Classification Search
CPC ..... G02F 1/13711; G02F 2001/133776; G02F 1/13394; G02F 2001/13398
See application file for complete search history.

(56) References Cited

U.S. PATENT DOCUMENTS

| | | |
|---|---|---|
| 2008/0137022 A1 | 6/2008 | Komeno et al. |
| 2010/0156945 A1* | 6/2010 | Yoshida ................ G02F 1/1345 345/690 |
| 2012/0147309 A1* | 6/2012 | Sato ...................... G02F 1/1341 349/138 |
| 2012/0314148 A1* | 12/2012 | Yamaguchi ......... H01L 51/5246 349/42 |
| 2013/0021553 A1 | 1/2013 | Satoh |
| 2014/0009706 A1 | 1/2014 | Moriguchi et al. |
| 2014/0028961 A1* | 1/2014 | Yanagisawa ...... G02F 1/133512 349/106 |
| 2015/0346535 A1* | 12/2015 | Moriwaki ......... G02F 1/133345 349/43 |

FOREIGN PATENT DOCUMENTS

| | | |
|---|---|---|
| JP | 2012-094524 A | 5/2012 |
| WO | WO2012132953 A1 | 10/2012 |
| WO | WO2013011601 A1 | 1/2013 |

* cited by examiner

LIQUID CRYSTAL PANEL

CROSS-REFERENCE TO RELATED APPLICATIONS

This application is the national phase under 35 U.S.C. § 371 of PCT International Application No. PCT/JP2014/063726 which has an International filing date of May 23, 2014 and designated the United States of America.

FIELD

The present invention relates to a liquid crystal panel in which a liquid crystal layer surrounded by a sealing material and two insulating films are arranged between two substrates facing each other and, more particularly, to a liquid crystal panel in which a slit is formed in a part or the whole of a peripheral edge portion, which is disposed on a further inner side than a position overlapping the sealing material, of an insulating film of the liquid crystal layer side.

BACKGROUND

In recent years, liquid crystal display panels of an active matrix type using switching elements such as thin film transistors (TFTs) have been widely used in display units of devices displaying videos and images. In such display panels, a plurality of TFTs are insulated from each other using an insulating film formed on a substrate, and a data signal and a scan signal are supplied to such TFTs by using data signal lines and scan signal lines that are wired horizontally and vertically.

While the data signal lines and the scan signal lines are insulated from each other so as not to overlap each other by using the insulating film, in a case where the thickness of the insulating film is small, delay of the signals occurs due to parasitic capacitance formed at the intersections of these signal lines, which becomes one factor for the quality degradation of image display using the TFTs.

Thus, in Japanese Patent No. 4916461, an active matrix substrate in which the thickness of a first interlayer insulating film insulating signal wirings (data signal lines) and scan wirings (scan signal lines) from each other is configured to be larger than that of a gate insulating film insulating gate electrodes has been disclosed, and the first interlayer insulating film is described to be appropriately formed, for example, using a spin-on glass (SOG) material.

SUMMARY

However, in a case where a first insulating film insulating the data signal lines and the scan signal lines from each other, for example, by using an SOG material, and a second insulating film that is partly deficient is formed on the liquid crystal layer side, there are cases where a contaminant component included in the outside air or the like passes through the first insulating film and infiltrates into the liquid crystal layer from a deficient portion of the second insulating film so as to cause defective display.

Such a problem is assumed to be caused by a relatively low barrier property for gas and/or liquid of the first insulating film.

The present invention is devised in consideration of such situations, and an object thereof is to provide a liquid crystal panel capable of preventing the infiltration of a contaminant component from the outside into a liquid crystal layer through an insulating film formed on a substrate.

According to the present invention, there is provided a liquid crystal panel including: a first substrate and a second substrate that faces the first substrate; a first insulating film that is formed on a second substrate side of the first substrate; a second insulating film that is formed on a second substrate side of the first insulating film; a liquid crystal layer that is disposed between the second insulating film and the second substrate; and a sealing material that surrounds an outer edge portion of the liquid crystal layer, wherein a slit is formed in a part or the whole of a peripheral edge portion of the second insulating film disposed on a further inner side than a position at which the second insulating film overlaps the sealing material, wherein a second slit is formed in a peripheral edge portion of the first insulating film that corresponds to the sealing material, and wherein the second insulating film is configured to include one or a plurality of films and is formed such that a film having a higher barrier property for gas and/or liquid than the first insulating film fills the second slit.

In the liquid crystal panel according to the present invention, a plurality of the second slits may be formed.

In addition, according to the present invention, there is provided a liquid crystal panel including: a first substrate and a second substrate that faces the first substrate; a first insulating film that is formed on a second substrate side of the first substrate; a second insulating film that is formed on a second substrate side of the first insulating film; a liquid crystal layer that is disposed between the second insulating film and the second substrate; and a sealing material that surrounds an outer edge portion of the liquid crystal layer, wherein a slit is formed in a part or the whole of a peripheral edge portion of the second insulating film disposed on a further inner side than a position at which the second insulating film overlaps the sealing material, wherein the first insulating film is formed on a further inner side than a position corresponding to an outer edge of the sealing material, and wherein the second insulating film is configured to include one or a plurality of films and is formed such that a film having a higher barrier property for gas and/or liquid than the first insulating film fills an area disposed on a further outer side than an outer edge portion of the first insulating film.

In the liquid crystal panel according to the present invention, the first insulating film may be formed to contain a spin-on glass (SOG) material.

In the liquid crystal panel according to the present invention, the second insulating film may be formed to contain at least one of silicon nitride ($SiN_x$), silicon oxide ($SiO_2$), and silicon oxynitride (SiON).

According to the present invention, even in a state in which the outer edge portion of the first insulating film formed on the substrate is brought into contact with the outside air, an infiltration path of a contaminant component that is formed from the outside air to the liquid crystal layer through the outer edge portion and the inside of the first insulating film and the slit of the second insulating film is blocked according to a barrier property for gas and/or liquid of the second insulating film, which is formed inside the second slit of the first insulating film.

Accordingly, the infiltration of a contaminant component from the outside to the liquid crystal layer through the insulating film formed on the substrate can be prevented.

The above and further objects and features will more fully be apparent from the following detailed description with accompanying drawings.

DETAILED DESCRIPTION

Hereinafter, embodiments of the present invention will be described in detail with reference to the drawings.

Embodiment 1

Figure 1:
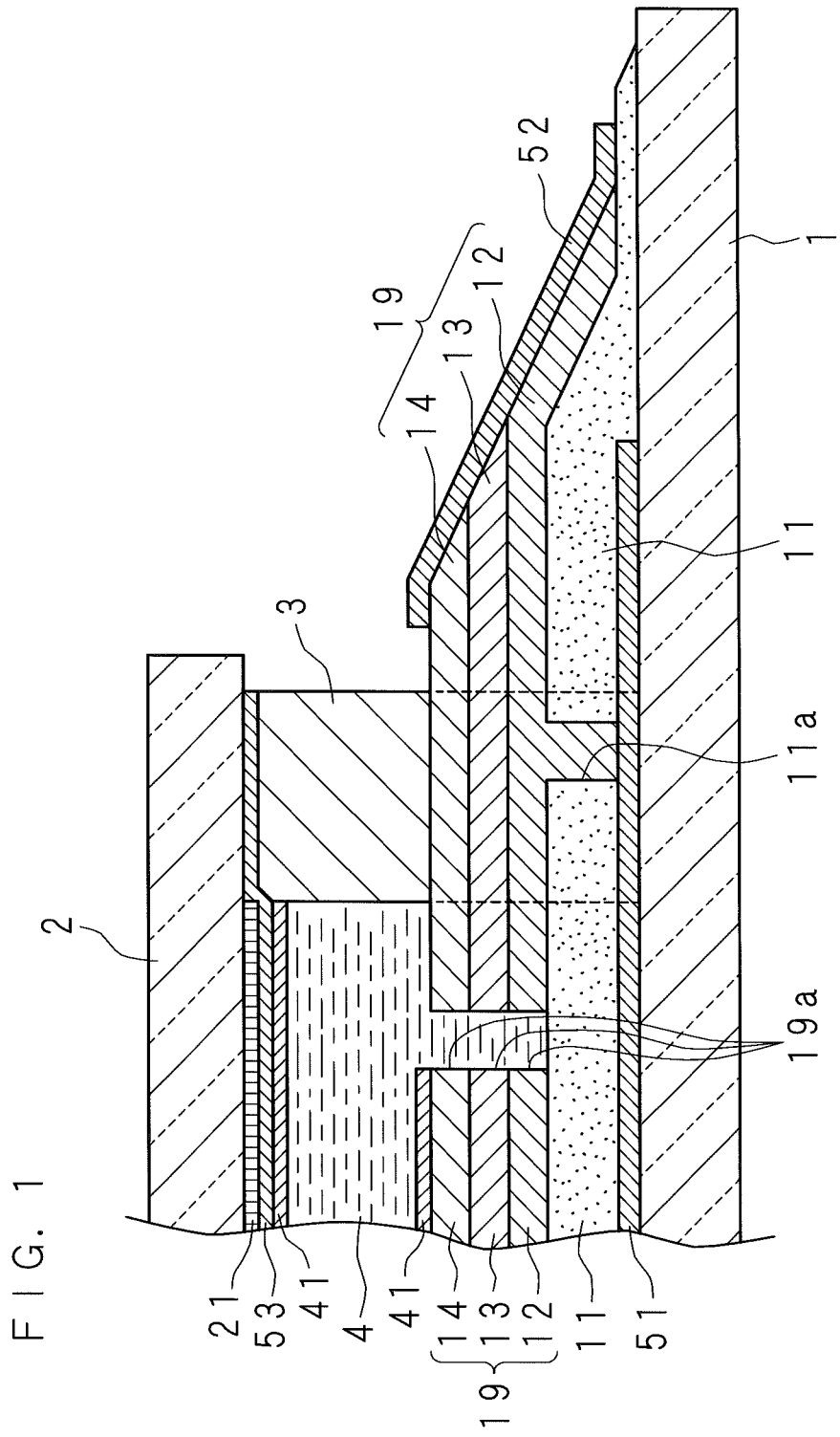
FIG. 1 is a cross-sectional view that schematically illustrates the configuration of a liquid crystal panel according to Embodiment 1 of the present invention.

FIG. 1 is a cross-sectional view that schematically illustrates the configuration of a liquid crystal panel according to Embodiment 1 of the present invention. The liquid crystal panel is configured by interposing a liquid crystal layer 4 having an outer edge portion being surrounded by a sealing material 3 between a first glass substrate (corresponding to a first substrate) 1 and a second glass substrate (corresponding to a second substrate) 2 each having a rectangular shape.

On one surface of the first glass substrate 1, which is the liquid crystal layer 4 side, a scan signal line 51 used for supplying a scan signal to a gate electrode of each TFT (corresponding to a thin film transistor), which is not illustrated in the figure, corresponding to each of a plurality of pixels is formed in the horizontal direction in FIG. 1. The scan signal line 51, for example, is acquired by patterning a film, which is made of metal such as aluminum, formed using a sputtering method. In addition, on one surface of the first glass substrate 1, a first insulating film 11, which is made from a spin-on glass (SOG) material, having an outer edge portion exposed to the outside air is formed to cover the scan signal line 51. In a peripheral edge portion (an area interposed between two broken lines illustrated in FIG. 1) of the first insulating film 11 that corresponds to the sealing material 3, a slit 11a (corresponding to a second slit) is formed through a dry etching process for example.

On the first insulating film 11, a gate insulating film 12, for example, made from silicon nitride ($SiN_x$) is formed using a chemical vapor deposition (CVD) method. The gate insulating film 12 may be formed to contain at least one of silicon nitride, silicon oxide ($SiO_2$), and silicon oxynitride (SiON). The gate insulating film 12 is a film used for insulating a source electrode, which is not illustrated in the figure, formed on the first insulating film 11 and is formed to fill the slit 11a. A data signal line, which is not illustrated in the figure, used for supplying a data signal to the source electrode of a TFT is formed on the gate insulating film 12 so as to intersect with the data signal line 51.

On the gate insulating film 12, a passivation film 13 made from silicon nitride, is formed for example, by using the CVD method. The passivation film 13 may be formed to contain at least one of silicon nitride, silicon oxide, and silicon oxynitride. The passivation film 13 is a film used for protecting a semiconductor layer, a source electrode, and a drain electrode (none thereof is not illustrated in the figure) of a TFT that is formed on the gate insulating film 12.

On the passivation film 13, an organic insulating film 14 is formed, for example, by coating the passivation film with an acrylic organic resin material and hardening the organic resin material. In present Embodiment 1, a second insulating film 19 is configured by the gate insulating film 12, the passivation film 13, and the organic insulating film 14.

In a part or the whole of a peripheral edge portion of the second insulating film 19 that is disposed on the inner side of a position (an area interposed between two broken lines illustrated in FIG. 1) at which the second insulating film 19 overlaps the sealing material 3, a slit 19a is formed, for example, through a dry etching process. The slit 19a is filled with liquid crystals included in the liquid crystal layer 4. In a part of the outer edge portion of the second insulating film 19, a transparent electrode 52 connected to an opposing electrode 53 to be described later is formed using the sputtering method.

On one surface of the second glass substrate 2 that is the liquid crystal layer 4 side, a color filter 21 is formed in which coloring layers of three colors RGB are formed for each pixel. On the color filter 21, the opposing electrode 53 formed by an indium tin oxide (ITO) film formed using the sputtering method is formed, and this opposing electrode 53 faces a pixel electrode (not illustrated in the figure) formed in correspondence with a pixel on the organic insulating film 14 of the first glass substrate 1 through the liquid crystal layer 4.

On the organic insulating film 14 of the first glass substrate 1 and on the opposing electrode 53 of the second glass substrate 2, alignment films 41 and 41 are formed, for example, by coating using a polyimide resin. In the process of coating the organic insulating film 14 with the polyimide resin, the slit 19a serves as a flow stopper of the polyimide resin, and thus, the alignment film 41 is not formed on a further outer periphery side than the slit 19a.

The SOG material described above is a material that can be used for forming a glass film (silica coating film) using a coating method such as a spin coating method or a slit coating method. The SOG material has a low specific dielectric constant and can easily form a thick film. Thus, by increasing the thickness of the first insulating film 11 by using the SOG material, parasitic capacitance formed at intersections of the scan signal lines 51 and the data signal lines, which intersect with each other through the first insulating film 11 and the second insulating film 19, can be effectively decreased, and a signal leakage due to a foreign material interposed between the scan signal line 51 and the data signal line can be prevented. In addition, in order to alleviate the generation of byproducts (dusts) when the first insulating film 11 formed by using the SOG material is processed through dry etching, the first insulating film 11 is formed up to the peripheral edge portion of the first glass substrate 1, and the etching area is decreased.

The first insulating film 11 is formed by baking the SOG material that is solved into a solvent and is used for the coating. In contrast to this, according to the CVD method forming the gate insulating film 12 and the passivation film 13, a silicon-based film material is supplied in a gas phase, and a film is formed through a chemical reaction of the surface of the base material in the gas phase. For this reason, generally, a film formed by using a silicon compound formed using the CVD method is denser than a film formed using the SOG material and has a superior barrier property for gas and/or liquid (for example, a gas barrier property, a steam barrier property, a barrier property for ions solved into water, and the like).

In the configuration described above, in a case where the slit 11a is filled with liquid crystals, there is concern that infiltration of a certain contaminant component occurs through a path formed from the outer edge portion of the first insulating film 11 exposed to the outside air to the liquid crystal layer 4, through the inside of the film and the slit 19a. In present Embodiment 1, the slit 11a is formed in the first insulating film 11, and the gate insulating film 12 is formed so as to fill the slit 11a. In other words, a part of the first insulating film 11 is substituted with the gate insulating film 12. For this reason, the path described above is blocked according to the barrier property for gas and/or liquid of the gate insulating film 12 that is formed up to the inside of the slit 11a of the first insulating film 11.

Here, in a case where the slit 11a is formed on a further inner side than the area interposed between the two broken lines illustrated in FIG. 1, when the second insulating film 19 is deficient on a further inner side than the position overlapping the sealing material 3, there is concern that infiltration of a contaminant component occurs through a path formed from the outside air to the liquid crystal layer 4 through the outer edge portion and the inside of the first insulating film 11 and the deficient portion of the second insulating film 19.

In addition, in a case where the slit 11a is formed on a further outer side than the area interposed between the two broken lines illustrated in FIG. 1, when the second insulating film 19 is deficient on a further outer side than the position overlapping the sealing material 3, there is concern that infiltration of a contaminant component occurs through a path formed from the outside air to the liquid crystal layer 4 through the deficient portion of the second insulating film 19, the inside of the first insulating film 11, and the slit 19a. In present Embodiment 1, by forming the slit 11a in the area interposed between the two broken lines illustrated in FIG. 1 and filling the slit 11a with the gate insulating film 12, two problems described above are avoided.

As above, according to present Embodiment 1, the liquid crystal layer 4 is disposed on the second glass substrate 2 side between the first glass substrate 1 and the second glass substrate 2, the first insulating film 11 and the second insulating film 19 are formed in this order on the surface of the first glass substrate 1 that is disposed on the liquid crystal layer 4 side, the outer edge portion of the liquid crystal layer 4 is surrounded by the sealing material 3, and the slit 19a is formed in a part or the whole of the peripheral edge portion of the second insulating film 19 on the further inner side than the position at which the second insulating film 19 overlaps the sealing material 3. Then, the slit 11a formed in the peripheral edge portion of the first insulating film 11 that corresponds to the sealing material 3 is filled with the gate insulating film 12 (a part of a plurality of films included in the second insulating film 19) having a higher barrier property for gas and/or liquid than the first insulating film 11.

Accordingly, even in a state in which the outer edge portion of the first insulating film 11 formed on the first glass substrate 1 is brought into contact with the outside air, the infiltration path of a contaminant component that is formed from the outside air to the liquid crystal layer 4 through the outer edge portion and the inside of the first insulating film 11 and the slit 19a of the second insulating film 19 is blocked according to the above-described barrier property of the gate insulating film 12 formed up to the inside of the slit 11a of the first insulating film 11. In addition, also in a case where the second insulating film 19 is deficient on a further inner side and/or a further outer side than the position corresponding to the sealing material 3, the infiltration path formed from the outside air to the liquid crystal layer 4 through the outer edge portion of the first insulating film 11 or the deficient portion of the second insulating film 19, the inside of the first insulating film 11, and the slit 19a or the deficient portion of the second insulating film 19 is blocked according to the barrier property of the gate insulating film 12 formed up to the inside of the slit 11a of the first insulating film 11.

Accordingly, the infiltration of a contaminant component to the liquid crystal layer from the outside through the insulating film formed on the substrate can be prevented.

Embodiment 2

While Embodiment 1 is in the form in which one slit 11a is arranged in the first insulating film 11, Embodiment 2 is in the form in which three slits 11a are arranged in a first insulating film 11.

Figure 2:
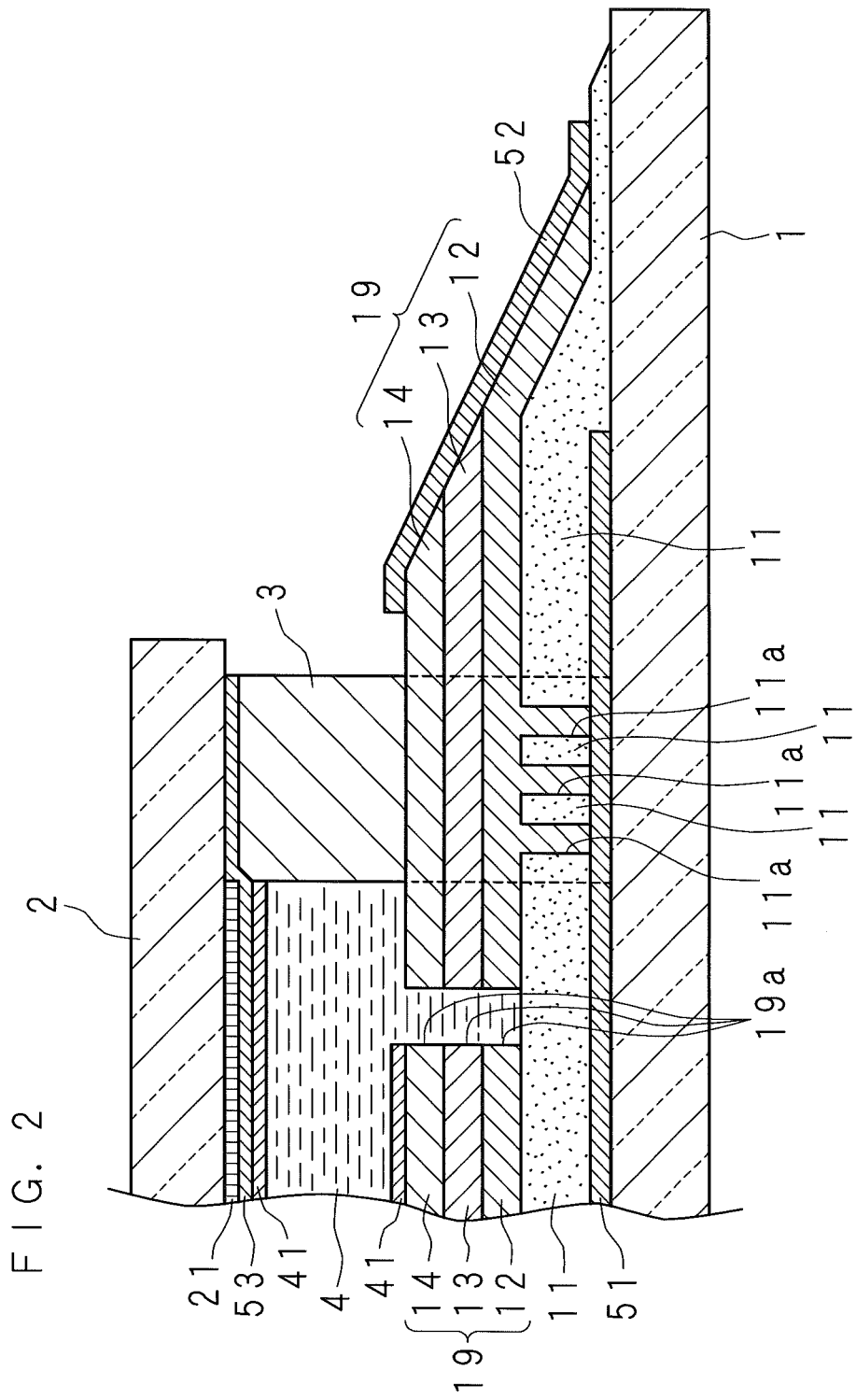
FIG. 2 is a cross-sectional view that schematically illustrates the configuration of a liquid crystal panel according to Embodiment 2 of the present invention.

FIG. 2 is a cross-sectional view that schematically illustrates the configuration of a liquid crystal panel according to Embodiment 2 of the present invention.

In the case illustrated in FIG. 2, in a peripheral edge portion (an area interposed between two broken lines illustrated in FIG. 2) of the first insulating film 11 that corresponds to a sealing material 3, slits 11a, 11a, and 11a (corresponding to second slits) are formed, for example, through a dry etching process. On the first insulating film 11, a gate insulating film 12 is formed so as to fill the slits 11a, 11a, and 11a. Here, the number of slits 11a is not limited to three.

Other than that, the same reference numeral is assigned to a portion corresponding to that of Embodiment 1, and detailed description thereof will not be presented.

In a case where the slit 11a is formed in the first insulating film 11 through etching, etching cannot be normally executed due to a resist residue according to defective exposure of a resist, and thus, there are cases where the formation of the slit 11 ends incompletely. In addition, also in a case where the slit 11a is normally formed, there are also cases where a foreign material is mixed into the inside of the slit 11a before the gate insulating film 12 is formed on the first insulating film 11.

The former case is equivalent to a case where the SOG material remains inside the slit 11a on appearance, and, in the latter case, a foreign material and the material of the gate insulating film 12 are mixed inside the slit 11a. In any of the cases, the blocking of the infiltration path of a contaminant component inside the first insulating film 11 is incomplete. However, as in present Embodiment 2, in a case where a plurality of slits 11a are arranged, the infiltration path can be reliably blocked.

As above, according to present Embodiment 2, the plurality of slits 11a are formed in the first insulating film 11, and each of the slits 11a is filled with the gate insulating film 12 having a higher barrier property for gas and/or liquid than the first insulating film 11.

Accordingly, also in a case where the blocking of the infiltration path of a contaminant component from the outside is incomplete for a case where one slit 11a is present, by arranging the plurality of slits 11a in the infiltration path, the infiltration path of a contaminant component can be reliably blocked.

Embodiment 3

While Embodiment 1 has a form in which the slit 11a formed in the first insulating film 11 is filled with the gate insulating film 12, Embodiment 3 has a form in which an area disposed on a further outer side than the outer edge portion of a first insulating film 11 is filled with a gate insulating film 12.

Figure 3:
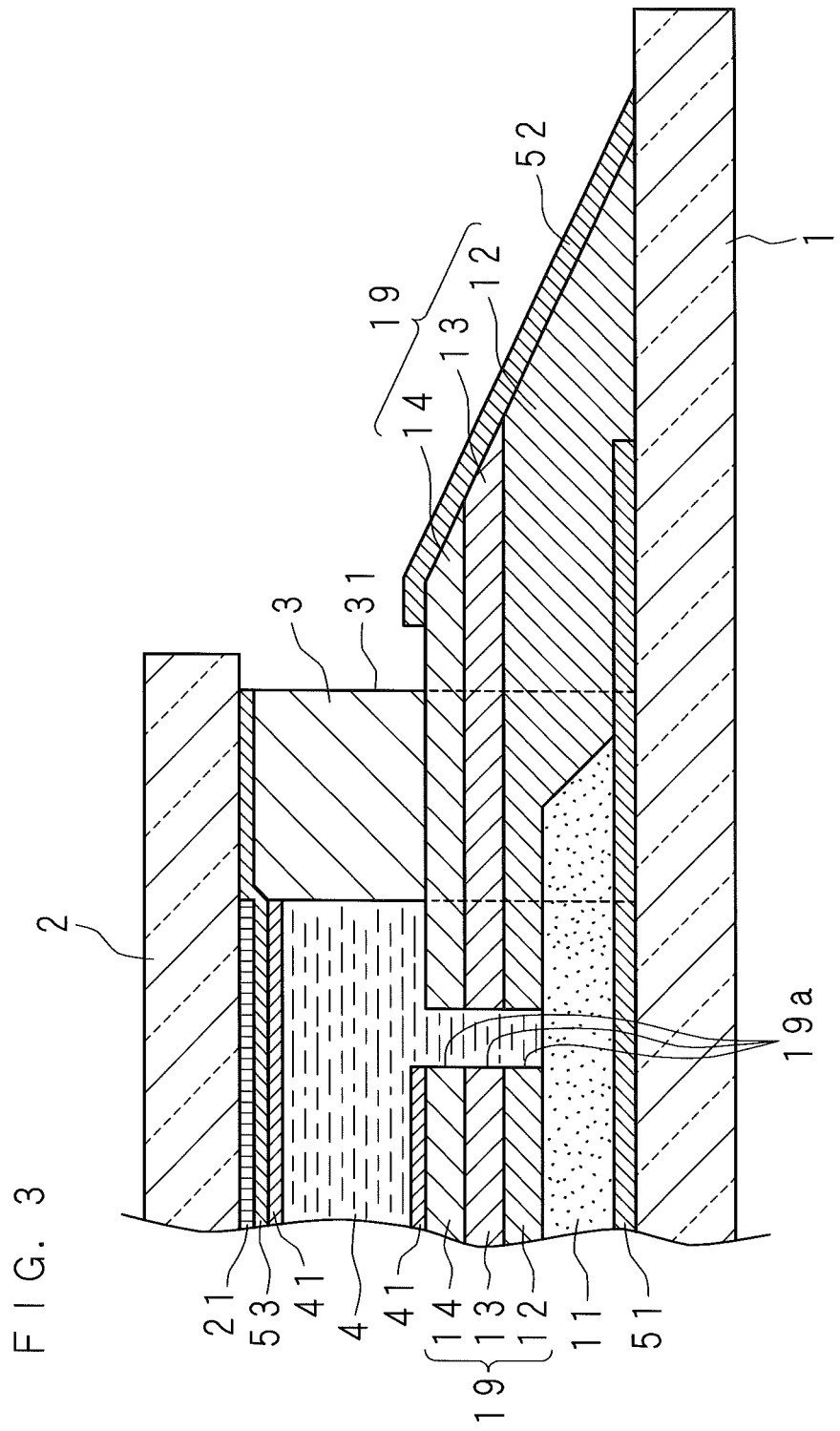
FIG. 3 is a cross-sectional view that schematically illustrates the configuration of a liquid crystal panel according to Embodiment 3 of the present invention.

FIG. 3 is a cross-sectional view that schematically illustrates the configuration of a liquid crystal panel according to Embodiment 3 of the present invention.

As illustrated in FIG. 3, on one surface of a first glass substrate 1, the first insulating film 11 made of an SOG material is formed on a further inner side than a position (a position denoted by a broken line in FIG. 3) corresponding to an outer edge 31 of a sealing material 3. On the first insulating film 11, for example, by using the CVD method, a gate insulating film 12 made of silicon nitride is formed to fill an area disposed on a further outer side than the outer edge portion of the first insulating film 11. In other words, the gate insulating film 12 according to Embodiment 3 is formed so as to replace the peripheral edge portion of the first insulating film 11 according to Embodiment 1 and so as to cover the first insulating film 11 according to present Embodiment 3.

Other than that, the same reference numeral is assigned to a portion corresponding to that of Embodiment 1, and detailed description thereof will not be presented.

In the configuration described above, since the outer edge portion of the first insulating film 11 is not exposed to the outside air, normally, a contaminant component does not directly infiltrate into a liquid crystal layer 4 from the outside air through the first insulating film 11 and the slit 19a. In a case where the outer edge of the first insulating film 11 is disposed on a further outer side than a position corresponding to the outer edge 31 of the sealing material 3, when a second insulating film 19 is deficient on a further outer side than a position overlapping the sealing material 3, there is concern that a contaminant component infiltrates through a path formed from the outside air to the liquid crystal layer 4 through the deficient portion of the second insulating film 19, the inside of the first insulating film 11, and the slit 19a. In present Embodiment 3, since the first insulating film 11 is formed on a further inner side than a position corresponding to the outer edge 31 of the sealing material 3, the path described above is blocked according to the barrier property for gas and/or liquid of the gate insulating film 12, which is formed to fill a further outer side than the outer edge portion of the first insulating film 11.

At a position disposed on the first glass substrate 1 that corresponds to the sealing material 3, a plurality of lead-out lines used for supplying a scan signal and a data signal to a scan signal line 51 and a data signal line not illustrated in the figure from the outside are arranged to partly intersect with each other. Meanwhile, the first insulating film 11 that separates the scan signal line 51 and the data signal line from each other is formed such that the outer edge is disposed on a further inner side than a position corresponding to the outer edge 31 of the sealing material 3. Thus, in order to reduce a signal delay by separating the lead-out lines of the scan signal line 51 and the data signal line from each other as much as possible at the position corresponding to the sealing material 3, it is preferable that the position of the outer edge of the first insulating film 11 may approach the position corresponding to the outer edge 31 of the sealing material 3.

As above, according to present Embodiment 3, the liquid crystal layer 4 is disposed on the second glass substrate 2 side between the first glass substrate 1 and the second glass substrate 2, the first insulating film 11 and the second insulating film 19 are formed in this order on the surface of the first glass substrate 1 that is disposed on the liquid crystal layer 4 side, the outer edge portion of the liquid crystal layer 4 is surrounded by the sealing material 3, and the slit 19a is formed in a part or the whole of the peripheral edge portion of the second insulating film 19 on the further inner side than the position at which the second insulating film 19 overlaps the sealing material 3. The first insulating film 11 is formed on a further inner side than the position corresponding to the outer edge 31 of the sealing material 3, and an area disposed on a further outer side than the outer edge portion of the first insulating film 11 is filled with the gate insulating film 12 having a higher barrier property for gas and/or liquid than the first insulating film 11.

Accordingly, the infiltration path of a contaminant component that is formed from the outside air to the liquid crystal layer 4 through the inside of the first insulating film 11 and the slit 19a of the second insulating film 19 can be blocked according to the barrier property of the gate insulating film 12 formed so as to replace the first insulating film 11.

In addition, according to Embodiments 1 to 3, the first insulating film 11 that is an insulating film insulating the scan signal line 51 and the data signal line from each other is formed using the SOG material that can be used for easily forming a thick film having a low dielectric constant.

Accordingly, the delay of a signal between the scan signal line 51 and the data signal line can be decreased. In addition, according to the barrier property for gas and/or liquid of the gate insulating film 12, which is formed so as to replace a part of the first insulating film 11 although a contaminant component can easily infiltrate into the inside through the first insulating film 11, the infiltration path of a contaminant component that is formed from the outside to the liquid crystal layer 4 can be blocked.

Furthermore, according to Embodiments 1 to 3, since the gate insulating film 12 is a dense film formed using silicon nitride, the infiltration path of a contaminant component that is formed from the outside to the liquid crystal layer 4 can be reliably blocked by the gate insulating film 12 formed so as to replace a part of the first insulating film 11.

In addition, according to Embodiments 1 to 3, the first insulating film 11 is formed by using the SOG material, and the gate insulating film 12 and the passivation film 13 are formed using silicon nitride, but the materials are not limited thereto. The barrier property for gas and/or liquid of the gate insulating film 12 may be configured to be higher than that of the first insulating film 11 regardless of the materials. In addition, while a case has been described in which the second insulating film 19 is formed by three layers of the gate insulating film 12, the passivation film 13, and the organic insulating film 14, the number of films is not limited to three, but, for example, the barrier property of the insulating film of the lowermost layer may be configured to be higher than that of the first insulating film 11.

The embodiments disclosed here should be considered to be exemplary in every aspect but not to be limited. The scope of the present invention is intended to include all the changes within a meaning and a range equivalent to the scope of the claims other than the meaning described above. In addition, the technical features described in the embodiments can be combined together.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A liquid crystal panel, comprising:
   a first substrate and a second substrate that faces the first substrate;

a first insulating film that is formed on a second substrate side of the first substrate;
a second insulating film that is formed on a second substrate side of the first insulating film;
an alignment film that is formed on a second substrate side of the second insulating film;
a liquid crystal layer that is disposed between the alignment film and the second substrate; and
a sealing material that surrounds an outer edge portion of the liquid crystal layer,
wherein a first slit is formed at a further inner position of the second insulating film than a whole area at which the second insulating film overlaps the sealing material,
wherein the first slit is filled with liquid crystals included in the liquid crystal layer,
wherein a second slit is formed in an area of the first insulating film at which the first insulating film overlaps the sealing material,
wherein the second insulating film is configured to include one or a plurality of films and is formed such that the one film or one of the plurality of films having a higher barrier property for gas and/or liquid than the first insulating film fills a whole area of the second slit,
wherein the first slit is a slit that serves as a flow stopper of resin forming the alignment film, and
wherein the alignment film is formed on a further inner side than the first slit and is not formed on a further outer side than the first slit.

2. The liquid crystal panel according to claim 1, wherein a plurality of the second slits are formed.

3. The liquid crystal panel according to claim 1, wherein the first insulating film is formed to contain a spin-on glass (SOG) material.

4. The liquid crystal panel according to claim 1, wherein the second insulating film is formed to contain at least one of silicon nitride ($SiN_x$), silicon oxide ($SiO_2$), and silicon oxynitride (SiON).

5. A liquid crystal panel, comprising:
a first substrate and a second substrate that faces the first substrate;
a first insulating film that is formed on a second substrate side of the first substrate;
a second insulating film that is formed on a second substrate side of the first insulating film;
an alignment film that is formed on a second substrate side of the second insulating film;
a liquid crystal layer that is disposed between the alignment film and the second substrate; and
a sealing material that surrounds an outer edge portion of the liquid crystal layer,
wherein a slit is formed at a further inner position of the second insulating film than a whole area at which the second insulating film overlaps the sealing material,
wherein the slit is filled with liquid crystals included in the liquid crystal layer,
wherein the first insulating film is formed on a further inner side than a position corresponding to an outer edge of the sealing material,
wherein the second insulating film is configured to include one or a plurality of films and is formed such that the one film or one of the plurality of films having a higher barrier property for gas and/or liquid than the first insulating film fills an area disposed on a further outer side than an outer edge portion of the first insulating film,
wherein the slit is a slit that serves as a flow stopper of resin forming the alignment film, and
wherein the alignment film is formed on a further inner side than the slit and is not formed on a further outer side than the slit.

6. The liquid crystal panel according to claim 5, wherein the first insulating film is formed to contain a spin-on glass (SOG) material.

7. The liquid crystal panel according to claim 5, wherein the second insulating film is formed to contain at least one of silicon nitride ($SiN_x$), silicon oxide ($SiO_2$), and silicon oxynitride (SiON).

8. The liquid crystal panel according to claim 1, wherein a data signal line and a scan signal line intersect with each other through the first insulating film.

9. The liquid crystal panel according to claim 5, wherein a data signal line and a scan signal line intersect with each other through the first insulating film.

10. The liquid crystal panel according to claim 1, wherein on a further outer side than the sealing material, a transparent electrode is present on a part of an outer edge portion of the second insulating film.

11. The liquid crystal panel according to claim 5, wherein on a further outer side than the sealing material, a transparent electrode is present on a part of an outer edge portion of the second insulating film.

12. The liquid crystal panel according to claim 1, wherein liquid crystals included in the liquid crystal layer are in contact with the first insulating film at a bottom of the first slit.

13. The liquid crystal panel according to claim 5, wherein liquid crystals included in the liquid crystal layer are in contact with the first insulating film at a bottom of the slit.

14. The liquid crystal panel according to claim 10, further comprising:
a color filter that is formed on a first substrate side of the second substrate; and
an opposing electrode that is formed on a first substrate side of the color filter,
wherein the transparent electrode is connected to the opposing electrode.

15. The liquid crystal panel according to claim 11, further comprising:
a color filter that is formed on a first substrate side of the second substrate; and
an opposing electrode that is formed on a first substrate side of the color filter,
wherein the transparent electrode is connected to the opposing electrode.

* * * * *